(12) United States Patent
Markov et al.

(10) Patent No.: US 11,162,830 B2
(45) Date of Patent: Nov. 2, 2021

(54) SENSOR DEVICE FOR DETECTING AT LEAST ONE FLOW PROPERTY OF A FLUID MEDIUM

(71) Applicant: Robert Bosch GmbH, Stuttgart (DE)

(72) Inventors: Alexander Markov, Stuttgart (DE); Andreas Kaufmann, Sontheim an der Brenz (DE); Bastian Bodenberger, Stuttgart (DE); Hans Beyrich, Freiberg/N. (DE); Michael Rittmann, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 292 days.

(21) Appl. No.: 15/766,501

(22) PCT Filed: Aug. 8, 2016

(86) PCT No.: PCT/EP2016/068901
§ 371 (c)(1),
(2) Date: Jul. 20, 2018

(87) PCT Pub. No.: WO2017/059985
PCT Pub. Date: Apr. 13, 2017

(65) Prior Publication Data
US 2018/0313678 A1    Nov. 1, 2018

(30) Foreign Application Priority Data
Oct. 8, 2015   (DE) .......................... 102015219501.5

(51) Int. Cl.
*G01F 1/00*   (2006.01)
*G01F 1/684*  (2006.01)
(Continued)

(52) U.S. Cl.
CPC ............ *G01F 1/684* (2013.01); *G01F 1/6842* (2013.01); *G01F 5/00* (2013.01); *G01F 15/006* (2013.01)

(58) Field of Classification Search
None
See application file for complete search history.

(56) References Cited

U.S. PATENT DOCUMENTS 6,581,447 B1 *   6/2003   Strohrmann ............ F02D 41/18
                                                              73/114.31
9,606,010 B2 *   3/2017   Kaiser .................... G01K 13/02
(Continued)

FOREIGN PATENT DOCUMENTS

CN       1130942 A      9/1996
CN       1860349 A      11/2006
(Continued)

OTHER PUBLICATIONS

International Search Report dated Oct. 20, 2016, of the corresponding International Application PCT/EP2016/068901 filed Aug. 8, 2016.
(Continued)

*Primary Examiner* — Alexander A Mercado
(74) *Attorney, Agent, or Firm* — Norton Rose Fulbright US LLP; Gerard Messina

(57) ABSTRACT

A sensor device is provided for acquiring at least one flow property of a fluid medium. The sensor device includes at least one sensor housing. At least one electronics module, having at least one flow sensor for acquiring the flow property, is accommodated in the sensor housing. The electronics module is at least partly accommodated in an electronics compartment. In addition, at least one moisture sensor is accommodated inside the sensor housing. The sensor housing has at least one inlet opening for exposing the moisture sensor to a moisture of the fluid medium. The (Continued)

electronics compartment is sealed relative to the inlet opening.

7 Claims, 4 Drawing Sheets

(51) Int. Cl.
 *G01F 5/00* (2006.01)
 *G01F 15/00* (2006.01)

(56) References Cited

U.S. PATENT DOCUMENTS

| | | | |
|---|---|---|---|
| 2002/0069699 A1* | 6/2002 | Sato | G01F 1/684 |
| | | | 73/204.22 |
| 2003/0037610 A1* | 2/2003 | Roeckel | G01F 1/6842 |
| | | | 73/204.22 |
| 2007/0089503 A1* | 4/2007 | Nakano | G01F 1/6842 |
| | | | 73/204.26 |
| 2008/0264181 A1* | 10/2008 | Sulouff | G01F 1/36 |
| | | | 73/861.42 |
| 2010/0031737 A1* | 2/2010 | Saito | G01F 1/6842 |
| | | | 73/114.33 |
| 2012/0237402 A1* | 9/2012 | Cantarelli | F02D 41/1448 |
| | | | 422/111 |
| 2013/0036806 A1* | 2/2013 | Kohno | G01F 1/684 |
| | | | 73/114.33 |
| 2013/0269419 A1* | 10/2013 | Etherington | G01F 1/692 |
| | | | 73/37 |
| 2013/0283895 A1* | 10/2013 | Etherington | G01F 15/02 |
| | | | 73/114.34 |
| 2013/0305822 A1* | 11/2013 | Graf | G01N 27/048 |
| | | | 73/431 |
| 2015/0177037 A1* | 6/2015 | Wagner | G01N 27/048 |
| | | | 73/204.22 |
| 2015/0377671 A1* | 12/2015 | Ooga | G01F 1/6842 |
| | | | 73/114.32 |
| 2016/0097661 A1* | 4/2016 | Hidaka | G01F 1/34 |
| | | | 73/114.33 |
| 2016/0146651 A1* | 5/2016 | Isoya | G01F 1/684 |
| | | | 73/114.34 |
| 2016/0202200 A1* | 7/2016 | Nakano | G01N 27/18 |
| | | | 73/23.31 |
| 2016/0290893 A1* | 10/2016 | Itakura | G01N 27/121 |
| 2016/0313164 A1* | 10/2016 | Schneider | G01F 15/18 |
| 2016/0313227 A1* | 10/2016 | Schneider | G01F 1/6842 |
| 2017/0059381 A1* | 3/2017 | Ban | G01F 1/696 |

FOREIGN PATENT DOCUMENTS

| | | |
|---|---|---|
| CN | 103988056 A | 8/2014 |
| CN | 104081169 A | 10/2014 |
| CN | 104364617 A | 2/2015 |
| DE | 102010043083 A1 | 5/2012 |
| EP | 2306161 A1 | 4/2011 |
| EP | 3012599 A1 | 4/2016 |
| WO | 2014203555 A1 | 12/2014 |

OTHER PUBLICATIONS

Konrad Reif (pub.), Sensoren im Kraftfahrzeug [Sensors in the motor vehicle], 1st ed. 2010, pp. 146-148; pp. 98-101; pp. 80-82; pp. 134-136.

* cited by examiner

SENSOR DEVICE FOR DETECTING AT LEAST ONE FLOW PROPERTY OF A FLUID MEDIUM

BACKGROUND INFORMATION

Numerous methods and devices are available for determining flow properties of fluid media, i.e., liquids and/or gases. The flow properties can generally be any physically and/or chemically measurable properties that qualify or quantify a flow of the fluid medium. In particular, they can be a flow speed and/or a mass flow and/or a volume flow.

Below, the present invention is described in particular with reference to so-called hot-film air mass sensors, as described for example in Konrad Reif (pub.), Sensoren im Kraftfahrzeug (Sensors in the motor vehicle), 1st ed. 2010, pp. 146-148. Generally, such hot-film air mass sensors are based on a sensor chip, in particular a silicon sensor chip, having a measurement surface over which the flowing fluid medium can flow. Generally, the sensor chip includes at least one heating element and at least two temperature sensors, situated for example on the measurement surface of the sensor chip. From an asymmetry of the temperature profile acquired by the temperature sensors, influenced by the flow of the fluid medium, a mass flow and/or volume flow of the fluid medium can be inferred. Hot-film air mass sensors are generally realized as plug-in sensors that can be attached fixedly or exchangeably in a flow pipe.

For example, this flow pipe can be an intake manifold of an internal combustion engine.

In order to be able to precisely infer particular flow properties of the fluid medium from the sensor signals of the hot-film air mass sensor, in many cases it is desirable to be able to provide further information about the fluid medium. For example, German Patent Application No. DE 10 2010 043 083 A1 describes a sensor device for acquiring a flow property of the fluid medium that has an air mass sensor having a sensor element for acquiring an air mass flow. In addition, a moisture sensor is provided.

Despite the advantages brought about by these sensor devices, there is still room for improvement. Thus, the humidity sensor, on a separate circuit board, is protected from media and mechanical action by a plastic frame having an integrated membrane that acts as a pressure equalizing element. In order to ensure that the humidity sensor has access to the measurement medium, the electronics compartment cover situated above it is provided with an inlet opening. The humidity sensor has a humidity frame and a membrane that is semi-permeable to moisture at the same height as the electronics compartment cover. Fluid media can move into the electronics compartment through the gap between the electronics compartment cover and the moisture sensor, or via a drain bore in the electronics compartment cover, and can also exit thereby. In particular the entry of water can damage the electronic components in the electronics compartment, for example by freezing.

SUMMARY

Therefore, a sensor device is proposed for acquiring at least one flow property of a flowing fluid medium that at least largely avoids the above-described disadvantages of known sensor devices, and that in particular is designed to protect the electronics compartment from penetrating media, in particular the entry of water, and at the same time to produce a connection of the surrounding environment to the moisture sensor.

Regarding the at least one flow property that is to be acquired, which can be acquired qualitatively and/or quantitatively, reference can be made for example to the above description of the existing art. In particular, this flow property can be a flow speed and/or a mass flow and/or a volume flow of the fluid medium. The fluid medium can be in particular a gas, preferably air. The sensor device can in particular be used in automotive technology, for example in the intake manifold of an internal combustion engine. However, other areas of use are also possible in general.

The sensor device according to the present invention for acquiring at least one flow property of a fluid medium includes at least one sensor housing. In the context of the present invention, a sensor housing is to be understood as a one-part or multi-part device that outwardly at least largely seals the sensor device, and at least largely protects it from mechanical effects, and preferably also other types of influences, such as chemical effects and/or moisture effects. In particular, the sensor housing can include at least one plug-in sensor or can be fashioned as a plug-in sensor, the plug-in sensor being capable of being placed into the flowing fluid medium, and an exchangeable or also permanent installation being possible. The plug-in sensor can for example extend into a flow pipe of the flowing fluid medium, such that the flow pipe itself may be a part of the sensor device, or may also be provided as a separate component, for example having an opening into which the plug-in sensor can be placed. The plug-in sensor and the sensor housing can in particular be produced at least partly from a plastic material, for example by an injection molding process.

In the sensor housing, at least one electronics module is accommodated having at least one flow sensor for acquiring the flow property. In the present context, accommodation in the sensor housing is to be understood as meaning that the electronics module is to be enclosed at least partly, preferably completely, by the sensor housing. The electronics module is situated at least partly in at least one electronics compartment of the sensor housing. In the context of the present invention, an electronics compartment is to be understood as a partly or completely sealed space inside the sensor housing, sealed by the sensor housing in at least one direction. Preferably, the electronics compartment includes at least one recess in the sensor housing that is accessible from a surface of the sensor housing, for example a cuboidal recess. As is explained in more detail below, the electronics compartment can for example be accessible for equipping, for example from the surface, and can be capable of being sealed permanently or reversibly by at least one sealing element, for example at least one electronics compartment cover.

Generally, a flow sensor is to be understood as any sensor element designed to acquire the at least one flow property. In particular, the flow sensor can be at least one hot-film air mass sensor chip, for example of the type described above. In particular, this hot-film air mass sensor chip can include at least one silicon chip having a measurement surface over which the flowing fluid medium can flow. At least one heating element and at least two temperature sensors can for example be situated on this sensor surface, and, as described above, from an asymmetry of the temperature profile measured by the temperature sensor the at least one flow property can be inferred. The at least one flow sensor can for example be situated on a sensor bearer of the electronics module that extends into the flowing fluid medium. The electronics module can in particular be made in one part and can in particular bear a control and/or evaluation circuit that is set up to control the flow sensor and/or to accept signals from the flow sensor. Correspondingly, the electronics module can for example have at least one circuit bearer. In addition, the electronics module can in particular have the at least one sensor bearer, which is preferably mechanically connected to the circuit bearer. For example, the circuit bearer can be situated in the electronics compartment of the sensor housing, and the sensor bearer can extend from this electronics compartment out into the fluid medium. It is particularly preferred if the sensor housing has at least one duct through which the fluid medium can flow, the sensor bearer of the electronics module that bears the flow sensor extending out from the electronics compartment into the at least one duct through which the fluid medium can flow in the sensor housing. This at least one duct can in particular be made in one piece, but however can also have at least one main duct and at least one bypass duct branching off from this main duct, the sensor bearer preferably extending into the bypass duct, as is generally in the related art. The circuit bearer of the electronics module can in particular include a circuit board that is used in isolation or for example is also mounted on a mechanical bearer, for example a base plate in the form of a stamped bent part, which can be made of a metallic material. The sensor bearer can be connected immediately to the circuit bearer or also to the bearer part, for example to the base plate, for example by injection molding the sensor bearer onto the base plate. Other realizations are also possible. Thus, for example it is possible to produce the electronics module from the material of the circuit board, both the circuit bearer and the sensor bearer being made from the circuit board material, preferably from a piece of the circuit board material. Again, alternatively or in addition it is also possible to use injection-molded circuit boards known from the existing art as the electronics module, for example injection-molded circuit boards in one or more so-called MID (molded interconnect device) technologies. Various embodiments are therefore possible.

In addition, the sensor device has at least one moisture sensor. The moisture sensor is accommodated inside the sensor housing. Situation inside the sensor housing is to be understood as a configuration in which the moisture sensor is at least partly surrounded by the sensor housing, preferably completely surrounded. A moisture sensor is to be understood generally as any sensor element that is set up to acquire a moisture value of the fluid medium.

For example, here resistive and/or capacitive sensor elements may be used, as are in the related art. Examples of such moisture sensors are described in Konrad Reif (pub.), 1st ed. 2010, pp. 98-101. Other types of moisture sensors may however also be used, alternatively or in addition, in the context of the present invention.

The sensor housing has at least one inlet opening for exposing the moisture sensor to a moisture of the fluid medium. Here, the electronics compartment is sealed relative to the inlet opening. In this way, the fluid medium can reach the moisture sensor, but cannot move into the electronics compartment. Correspondingly, increased security against penetrating fluid media, in particular an increased entry of water which could cause a danger of freezing, is ensured.

Preferably, as mentioned above, the sensor housing has at least one electronics compartment cover, the electronics compartment cover being designed to seal the electronics compartment, and the opening being formed in the electronics compartment cover. The moisture sensor can have at least one measurement chamber, the measurement chamber being limited by at least one membrane that is at least partly permeable to moisture, and by a frame. In the electronics compartment, a gel can be provided, the gel at least partly covering the electronics module. Preferably, the gel is cured, so that it can no longer flow and protects the electronics module. The electronics compartment cover can have a projection protruding in the direction toward the electronics compartment, the projection limiting the opening, and the projection extending into the gel. In this way, the electronics compartment is additionally sealed. Alternatively, a sealing element can be situated between the opening and the moisture sensor. Preferably, the sealing element is situated between the electronics compartment cover and the compartment in such a way that the sealing element surrounds the opening. The electronics module can have a moisture sensor. As mentioned above, the electronics module can have a circuit bearer, the moisture sensor being situated on the circuit bearer. As mentioned above, the electronics module can include a sensor bearer, the sensor bearer bearing the flow sensor and extending from the electronics compartment into at least one duct in the housing through which the fluid medium can flow, the flow sensor and the moisture sensor being situated on the same side of the electronics module.

The inlet opening can have any cross-section, for example a rectangular and/or around and/or polygonal cross-section. Other shapes are also possible.

In addition, the sensor device can also have one or more further sensor elements for acquiring at least one additional physical and/or chemical property of the fluid medium. In particular, the sensor device can in addition have at least one temperature sensor, in particular at least one temperature sensor situated on an external side of the sensor housing. For example, a temperature sensor can be situated on an external side of the sensor housing in such a way that this sensor is situated on a side situated opposite the moisture sensor. Other configurations are however also possible. In particular, the temperature sensor can be situated in at least one recess on a side wall of the sensor housing. In particular, the temperature sensor can include at least one temperature-sensitive resistor. Alternatively or in addition, other types of temperature sensors are usable. The temperature sensor can in particular be made so that the flowing fluid medium can flow freely over it, i.e., such that it is not enclosed by the sensor housing of the sensor element. The temperature sensor can in particular be connected to the sensor housing by a non-positive connection and/or positive connection, for example in that supply lines of the temperature sensor are caulked to an outer wall of the sensor housing, or connected thereto in some other way. Supply lines of the temperature sensor can in particular be led into the interior of the sensor housing, and can there be connected for example to the electronics module and/or connected to a plug connector of the sensor device. Various other realizations are possible.

The sensor device can in addition have for example a pressure sensor. Here, generally, a pressure sensor is to be understood as any sensor element that is set up to acquire a pressure of the fluid medium. In particular, this can be a pressure sensor such as those described for example in Konrad Reif (pub.), Sensoren im Kraftfahrzeug (Sensors in the motor vehicle), 1st ed. 2010, pp. 80-82 and 134-136. However, other types of pressure sensors may also be used, alternatively or in addition, such as pressure sensors that are based immediately on the use of one or more strain gauges or similar pressure sensor elements.

BRIEF DESCRIPTION OF THE DRAWINGS

Further optional details and features of the present invention result from the following description of preferred exemplary embodiments, shown schematically in the Figures.

DETAILED DESCRIPTION OF EXAMPLE EMBODIMENTS

Figure 1:
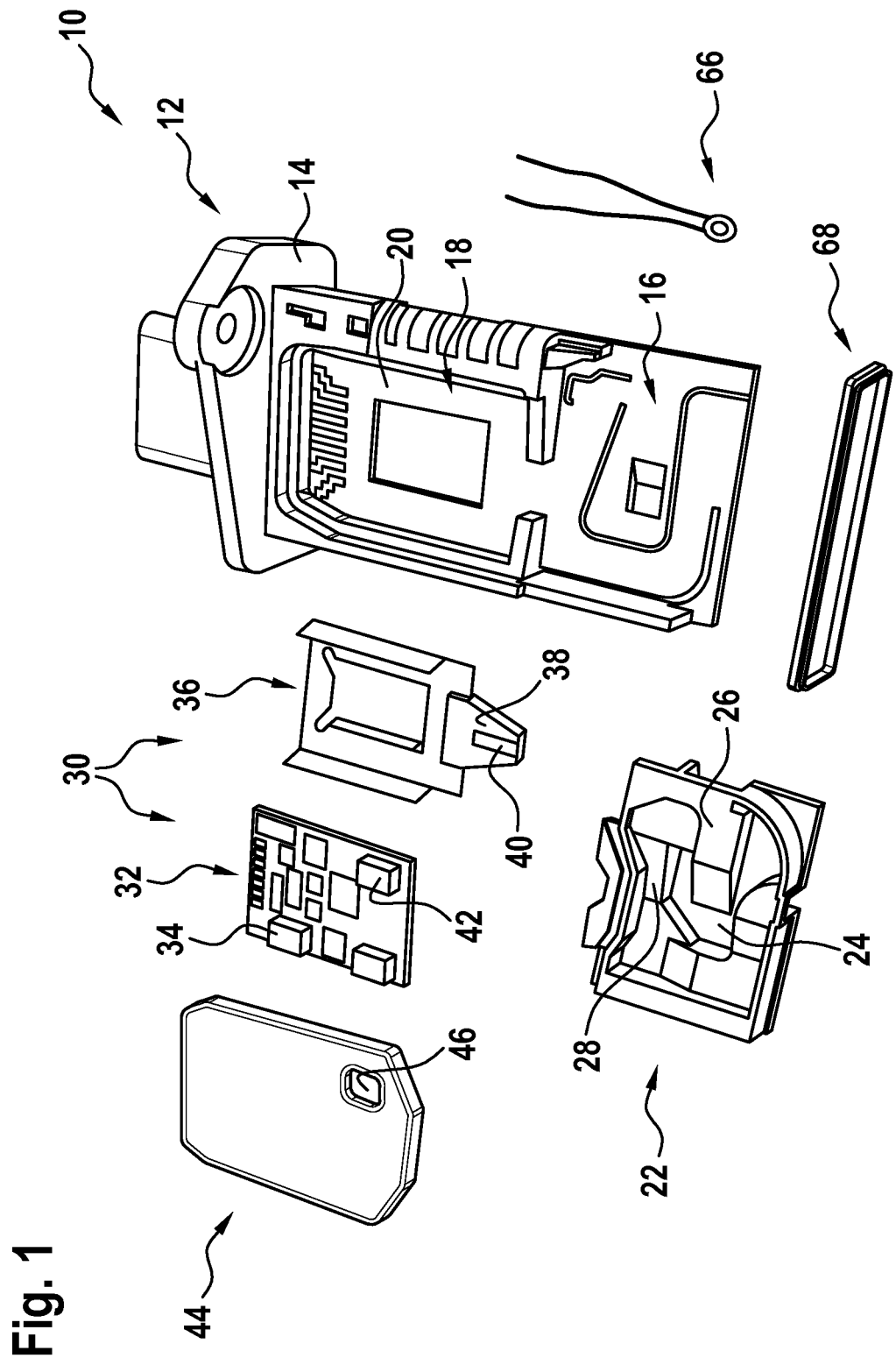
FIG. 1 shows an exploded view of a sensor device according to the present invention for acquiring at least one flow property of a fluid medium.

FIG. 1 shows an exploded view of a sensor device 10 according to the present invention for acquiring at least one flow property of a fluid medium. In this exemplary embodiment, sensor device 10 is realized as a hot-film air mass sensor, and includes a plug-in sensor 12. Plug-in sensor 12 can be placed into a flow of the fluid medium, for example an air intake mass flow; for example, it can be reversibly inserted into an intake pipe, or permanently installed. Plug-in sensor 12 includes a sensor housing 14. Sensor housing 14 accommodates a duct region 16 and an electronics region 18 having an electronics compartment 20 made in sensor housing 14. Duct region 16 can be sealed by a bypass duct cover 22. A duct 24, through which the fluid medium can flow, is formed in bypass duct cover 22. Duct 24 has a main duct 26 and a bypass duct 28 that branches off therefrom.

An electronics module 30 is accommodated in electronics compartment 20. Electronics module 30 has a circuit bearer 32 having a control and/or evaluation circuit 34 that can for example be accommodated on a base plate 36. In addition, electronics module 30 has a sensor bearer 38 in the form of a wing that is injection-molded onto base plate 36. Sensor bearer 38 extends into bypass duct 28. A flow sensor 40, in the form of a hot-film air mass sensor chip, is embedded in sensor bearer 38.

In addition, sensor device 10 has a moisture sensor 42. Moisture sensor 42 is accommodated inside sensor housing 14. Thus, moisture sensor 42 is situated on circuit bearer 32 of electronics module 30. Sensor bearer 38, base plate 36, and circuit bearer 32 form electronics module 30, which can additionally include control and/or evaluation circuit 34. In addition to sensor bearer 38, the electronics of circuit bearer 32 and of control and/or evaluation circuit 34 are glued onto base plate 36. Flow sensor 40, moisture sensor 42, and control and/or evaluation circuit 34 are as a rule connected to one another by a bonded connection. The resulting electronics module 30 is for example glued into electronics compartment 20.

In addition, sensor device 10 has an electronics compartment cover 44. Electronics compartment cover 44 is designed to seal electronics compartment 20. The sealing can be made permanent or reversible. In addition, sensor device 10 has at least one inlet opening 46 for exposing moisture sensor 42 to a moisture of the fluid medium. Inlet opening 46 is made in electronics compartment cover 44. As is shown in FIG. 1, flows sensor 40 and moisture sensor 42 are situated on the same side of electronics module 30 or of circuit bearer 32. In other words, flow sensor 40 and moisture sensor 42 are situated together on one and the same side of electronics module 30, or of circuit bearer 32.

Figure 2:
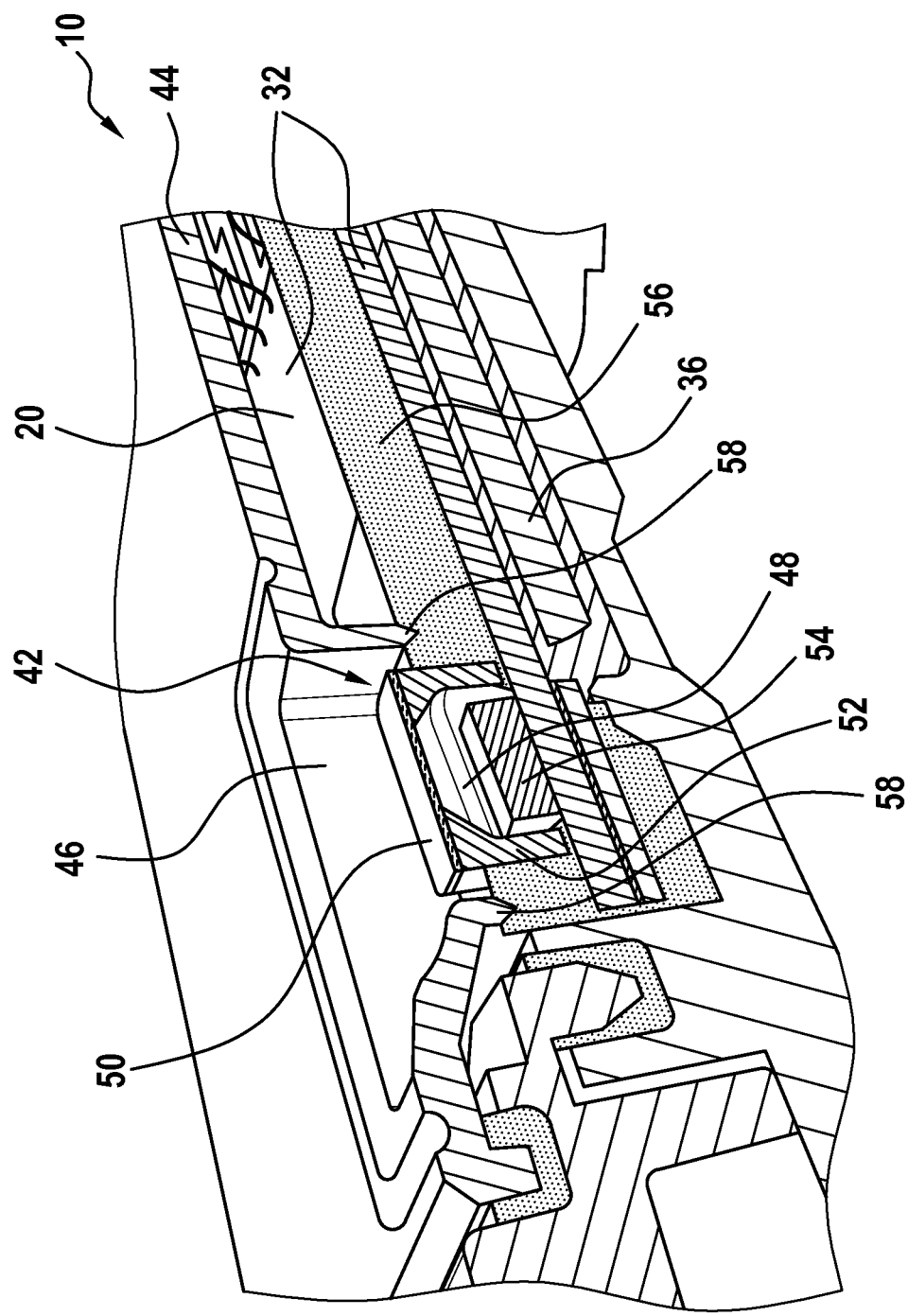
FIG. 2 shows a cross-sectional view of a sensor device according to a first specific embodiment of the present invention.

FIG. 2 shows a cross-sectional view of sensor device 10 according to a first possible specific embodiment. As is shown in FIG. 2, moisture sensor 42 has at least one measurement chamber 48. Measurement chamber 48 is limited by a membrane 50 that is at least partly permeable to moisture, and by a frame 52. Moisture sensor 42 can be realized as moisture module 54, or can be contained in a moisture module 54. A gel 56 is provided in electronics compartment 20. Gel 56 covers electronics module 30, and in particular circuit bearer 32, at least partially. Here, gel 56 is cured, for example by thermal treatment or by UV light, and is thus no longer capable of flowing. Electronics compartment cover 44 has a projection 58 that stands out in the direction towards electronics compartment 20. Projection 58 is for example formed as a sealing blade. Projection 58 limits inlet opening 46. Projection 58 extends into gel 56. In other words, projection 58 penetrates into gel 56. Gel 56 protects the electronics of sensor device 10. Electronics compartment cover 44 is provided for mechanical protection. Projection 58, which penetrates into gel 56, seals the direct measurement environment of moisture sensor 42 towards electronics compartment 20. In this way, the protection from media of the installed electronic components is increased, and the response time of moisture sensor 42 is increased by the clear limiting of the moisture measuring environment.

Figure 3:
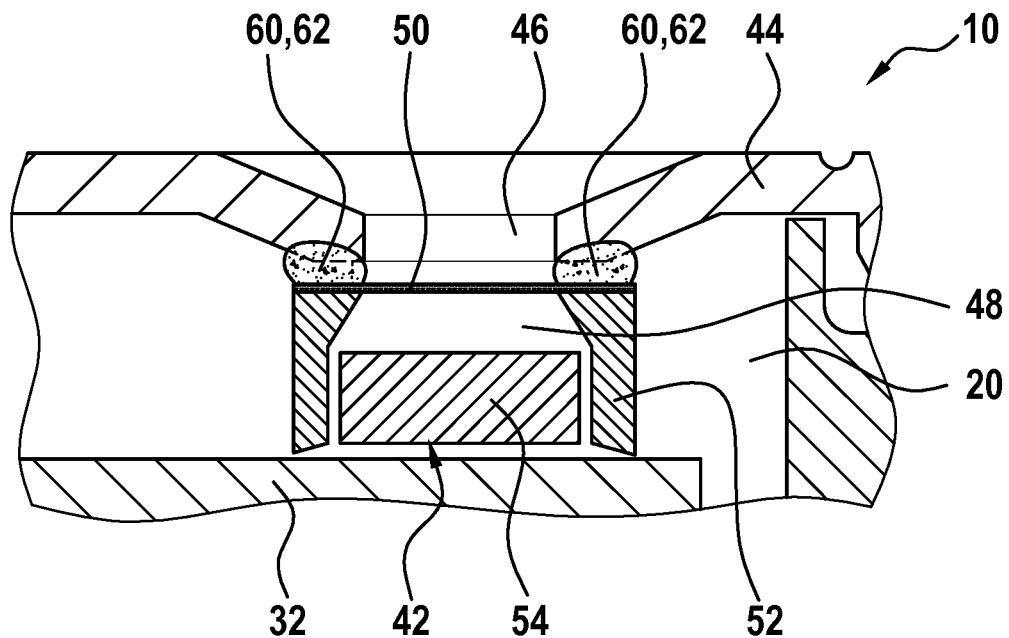
FIG. 3 shows a cross-sectional view of a sensor device according to a second specific embodiment.

FIG. 3 shows a cross-sectional view of a sensor device 10 according to a second possible specific embodiment. In the following, only the differences from the preceding specific embodiment are described, and identical components are provided with identical reference characters. In the sensor device of the second specific embodiment, a sealing element 60 is situated between inlet opening 46 and moisture sensor 42. In sensor device 10 of the second specific embodiment, sealing element 60 is a bead of adhesive 62. Sealing element 60, or bead of adhesive 62, is, more precisely, situated between electronics compartment cover 44 and frame 52 of moisture sensor 42 in such a way that sealing element 60, or adhesive bead 62, surrounds inlet opening 46.

Figure 4:
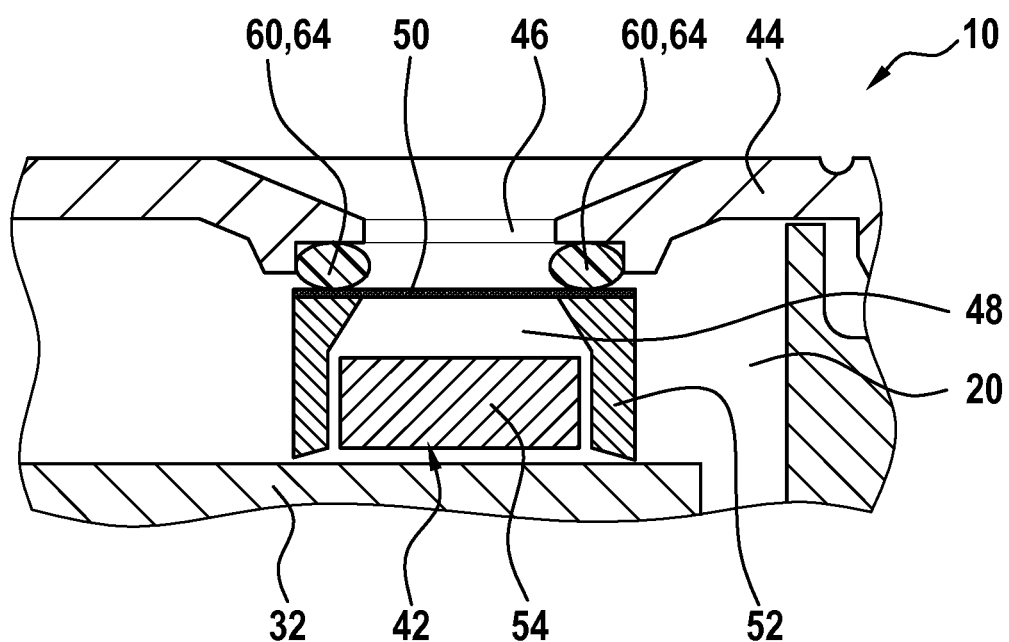
FIG. 4 shows a cross-sectional view of a sensor device according to a third specific embodiment.

FIG. 4 shows a cross-sectional view of a sensor device 10 according to a third possible specific embodiment. In the following, only the differences from the preceding specific embodiments are described, and identical components are provided with identical reference characters. Sensor device 10 of the third specific embodiment is a modification of sensor device 10 of the second specific embodiment. In sensor device 10 of the third specific embodiment, sealing element 60 is fashioned as media-resistant seal 64, and is situated between electronics compartment cover 44 and frame 52 of moisture sensor 42 in such a way that seal 64 surrounds inlet opening 46. Here, seal 64 can be pressed against frame 52 by electronics compartment cover 44, in order in this way to achieve an adequate sealing effect.

Figure 5:
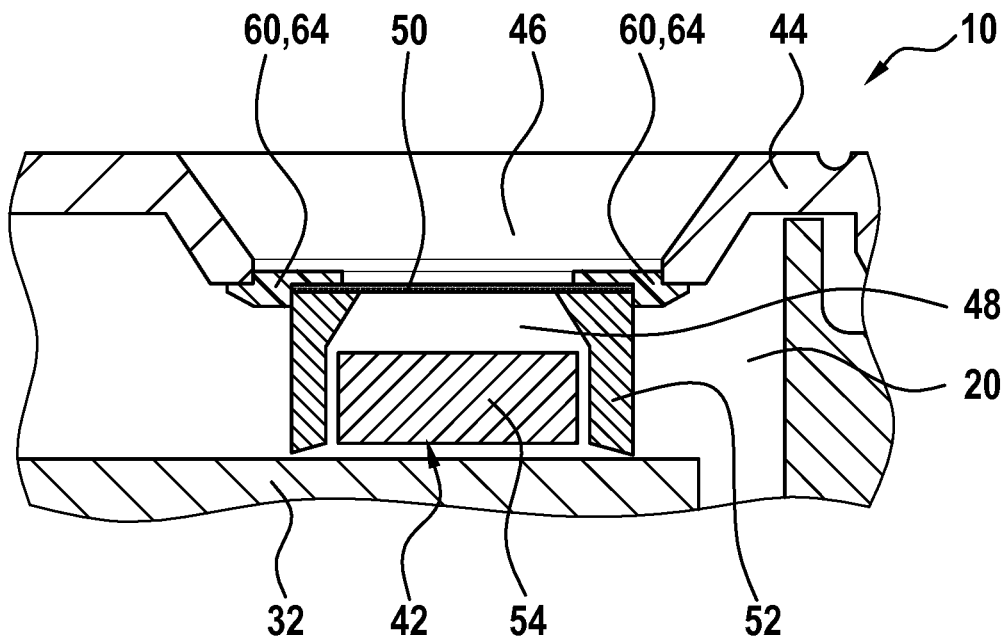
FIG. 5 shows a cross-sectional view of a sensor device according to a fourth specific embodiment.

FIG. 5 shows a cross-sectional view of a sensor device 10 according to a fourth specific embodiment. In the following, only the differences from the preceding specific embodiment are described, and identical components are provided with identical reference characters. In sensor device 10 of the fourth specific embodiment, seal 64 is oriented axially. In other words, seal 64 is situated at least partly above frame 52, and is oriented toward electronics compartment cover 44. Therefore, electronics compartment cover 44 presses seal 64 in the direction toward frame 52.

Figure 6:
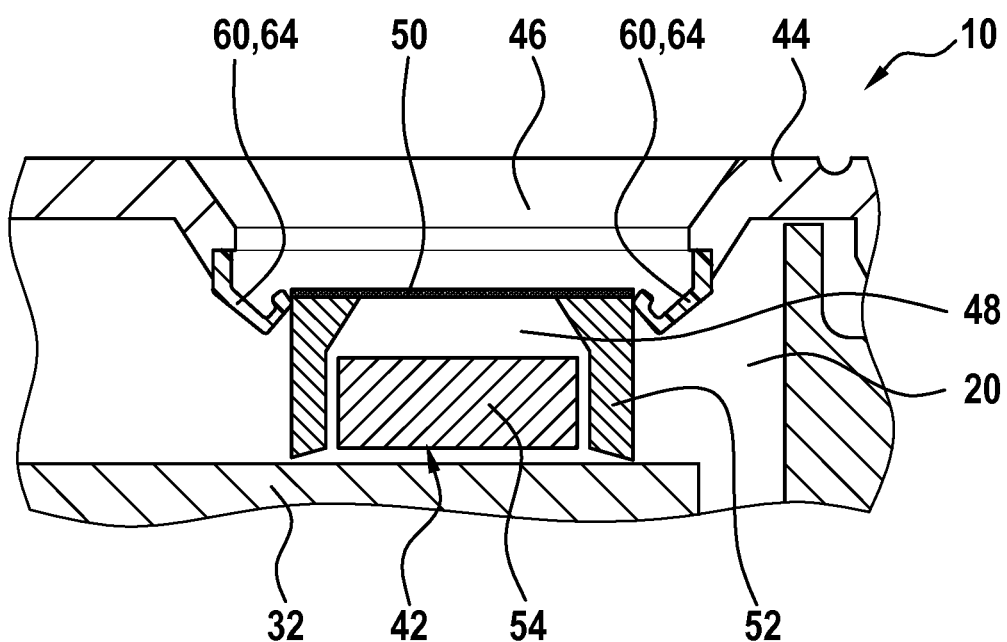
FIG. 6 shows a cross-sectional view of a sensor device according to a fifth specific embodiment.

FIG. 6 shows a sensor device according to a fifth specific embodiment of the present invention. In the following, only the differences from the preceding specific embodiment are described, and identical components are provided with identical reference characters. In sensor device 10 of the fifth specific embodiment, seal 64 is oriented radially. In other words, seal 64 is situated laterally on frame 52, and contacts electronics compartment cover 44. In this way, a lateral sealing effect is achieved.

Generally, in all described specific embodiments, sensor device 10 is designed to acquire additional flow properties of the fluid medium. As shown in FIG. 1, sensor device 10 can for example in addition have at least one temperature sensor 66 designed to acquire a temperature of the fluid medium. Temperature sensor 66 can be situated on an external side of sensor housing 14. For example, temperature sensor 66 can be situated in such a way on an external side of sensor housing 14 situated opposite moisture sensor 42. In particular, temperature sensor 66 can be situated in at least one recess on a side wall, or on the rear side, of sensor housing 14. As is further shown in FIG. 1, the sensor device can in addition have a housing seal 68 designed to seal sensor housing 14 relative to a flow pipe.

What is claimed is:

1. A sensor device for acquiring at least one flow property of a fluid medium, comprising:
    at least one sensor housing having a duct region;
    at least one electronics module having at least one flow sensor for acquiring the flow property, accommodated in the sensor housing, the electronics module being accommodated at least partly in an electronics compartment;
    at least one moisture sensor accommodated inside the sensor housing, the sensor housing having at least one inlet opening for exposing the moisture sensor to a moisture of the fluid medium;
    wherein the electronics compartment is sealed relative to the inlet opening,
    wherein the electronics module has a circuit bearer having a control and/or evaluation circuit, which is accommodated on a base plate,
    wherein the control and/or evaluation circuit is accommodated in the electronic compartment,
    wherein the at least one moisture sensor is situated on the same side of the circuit bearer as the control and/or evaluation circuit,
    wherein the electronics module has a sensor bearer, which is in the form of a wing that is integrated with the base plate,
    wherein a bypass duct cover is configured to seal the duct region,
    wherein a duct formed in the bypass duct cover includes a main duct and a bypass duct, the bypass duct branching off from the main duct,
    wherein the sensor bearer extends into the bypass duct,
    wherein the at least one flow sensor is embedded in the sensor bearer,
    wherein an electronics compartment cover has a projection that extends in a direction toward the electronics compartment, the projection limiting the inlet opening, and the projection includes a sealing blade, which penetrates into a gel and which completely surrounds the moisture sensor so as to form the inlet opening, and which seals a direct measurement environment of the moisture sensor towards the electronics compartment,
    wherein the gel has been cured so that it does not flow, so that the projection, including the sealing blade which extends into the cured gel, and the cured gel together protect the electronics module from the fluid medium, and a response time of the moisture sensor is increased by the sealing blade and the cured gel by limiting the direct measurement environment of the moisture sensor.

2. The sensor device as recited in claim 1, wherein the electronics compartment is sealed relative to the inlet opening by the electronics compartment cover of the sensor housing, and wherein the inlet opening is formed in the electronics compartment cover.

3. The sensor device as recited in claim 2, wherein the moisture sensor has at least one measurement chamber, the measurement chamber being limited by at least one membrane that is at least partly permeable to moisture, and by a frame.

4. The sensor device as recited in claim 3, wherein the gel is provided in the electronics compartment, the gel at least partly covering the electronics module.

5. The sensor device as recited in claim 1, wherein the electronics module has the moisture sensor.

6. The sensor device as recited in claim 1, wherein the moisture sensor is situated on the circuit bearer.

7. The sensor device as recited in claim 1, wherein the electronics module includes the sensor bearer, the sensor bearer bearing the flow sensor and extending from the electronics compartment into the duct region in the sensor housing through which the fluid medium flows, the at least one flow sensor and the moisture sensor being situated on the same side of the electronics module.

* * * * *